United States Patent [19]
Wright

[11] 3,871,755
[45] Mar. 18, 1975

[54] PHOTOGRAPHIC FILM HANDLING CASSETTE AND APPARATUS

[75] Inventor: Joseph H. Wright, Marblehead, Mass.

[73] Assignee: Polaroid Corporation, Cambridge, Mass.

[22] Filed: Dec. 29, 1972

[21] Appl. No.: 319,536

[52] U.S. Cl............... 352/130, 242/68.3, 242/71.8, 242/199, 352/72
[51] Int. Cl. .......................................... G03b 23/04
[58] Field of Search ........... 242/199, 200, 198, 197, 242/68.3, 71.8; 352/72, 78 R, 78 C, 130

[56] References Cited
UNITED STATES PATENTS

| | | | |
|---|---|---|---|
| 3,367,596 | 2/1968 | Osborn | 242/68.3 |
| 3,600,071 | 8/1971 | Downey | 242/199 |
| 3,666,193 | 5/1972 | Wellington et al. | 242/68.3 |
| 3,686,470 | 8/1972 | Stahlberg et al. | 242/198 |
| 3,756,521 | 9/1973 | Werner | 242/68.3 |

Primary Examiner—George F. Mautz
Attorney, Agent, or Firm—John S. Vale

[57] ABSTRACT

A system for coupling a film handling cassette reel to a camera or projection drive shaft is provided. Components of the system are uniquely configured to compensate for eccentricity of the reel and drive shafts axes of rotation and to minimize wear at the reel and drive shaft interface. The system is especially well suited for use with a multi-purpose self-developing film handling cassette.

7 Claims, 10 Drawing Figures

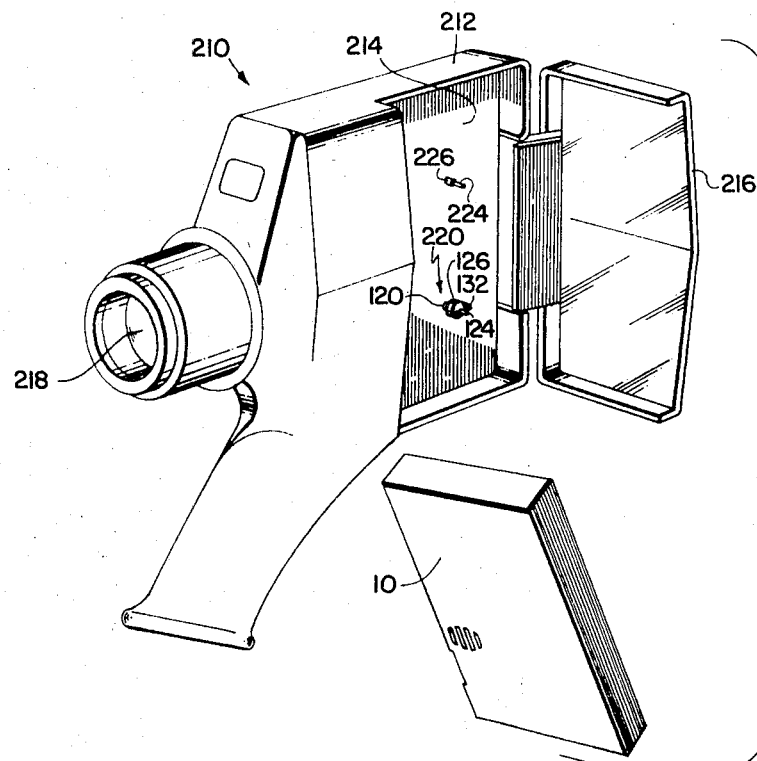
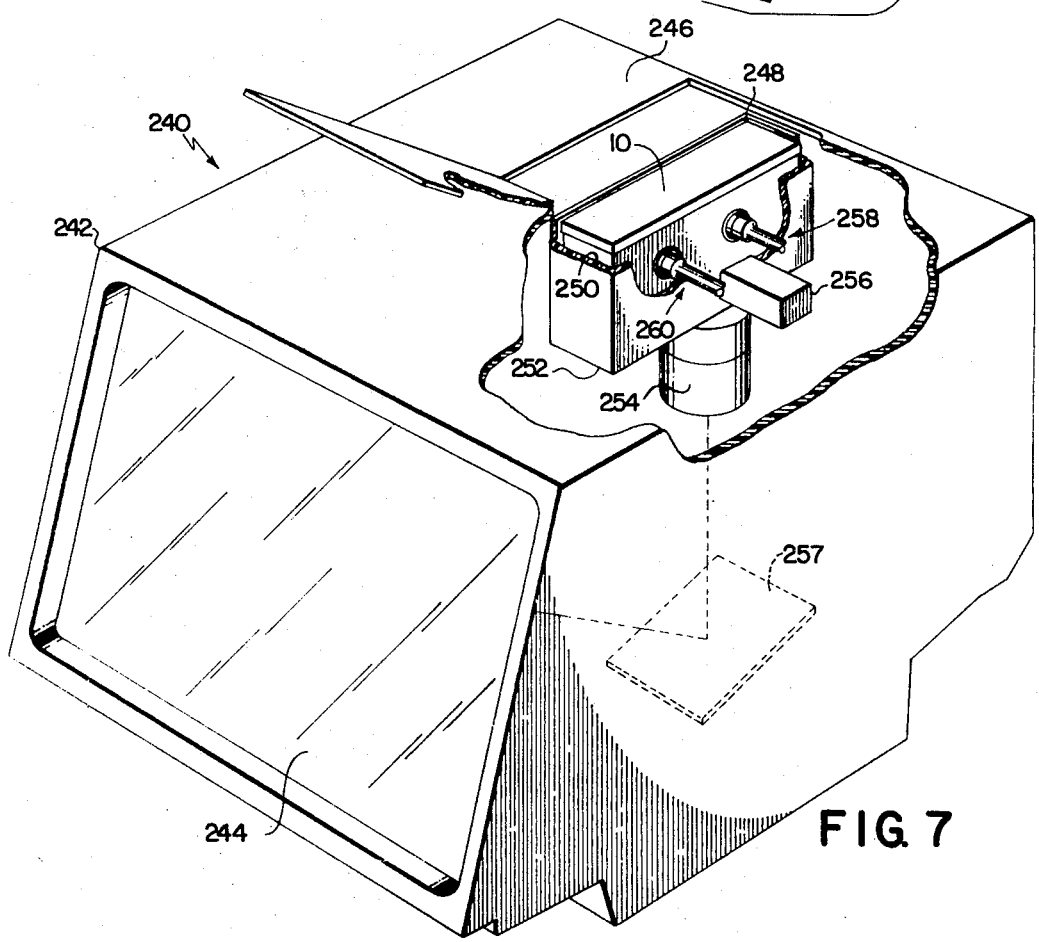

PHOTOGRAPHIC FILM HANDLING CASSETTE AND APPARATUS

BACKGROUND OF THE INVENTION

1. Field of the Invention

The present invention relates to the field of photography and, more particularly, to motion picture film handling cassettes and photographic apparatus, i.e., cameras and projectors with which the cassettes are adapted to be used.

2. Description of the Prior Art

A current trend in motion picture film systems designed for the mass amateur market is to provide film cartridges or cassettes which are adapted to be inserted into an appropriate motion picture camera to expose a roll of film contained therein. After exposure the cartridge is sent to a processing laboratory where the film is removed from the cartridge, developed, transferred to a new reel or cartridge, and then returned to the user for projection.

Recently, self-developing motion picture film handling systems have been developed which feature a multi-purpose film handling cassette adapted for use with a motion picture camera and projector or viewer for exposing, processing, and projecting a length of photographic film strip without having to remove the film strip from the cassette.

The cassette comprises a housing for enclosing supply and take-up reels having a length of unexposed film strip coupled therebetween, a combination exposure and projection station providing access to the film strip for exposure and projection, and a processing station for treating a photosensitive emulsion on one side of the film strip with a liquid processing composition.

In operation, the cassette is mounted in the motion picture camera and the film strip is advanced from the supply reel through the exposure station, where it is subjected to image-bearing light, and then onto the take-up reel. The cassette may then be transferred to a motion picture projector for processing and projection. During the initial rewind of the film strip from the take-up reel to the supply reel, it passes through the processing station and is coated with the liquid processing composition for developing latent images in the exposed photosensitive emulsion. Development takes in a relatively short period of time so that almost immediately after rewind, the film strip may be advanced through the projection station for viewing.

Exemplary of such new and unique systems are those described in U.S. Pat. No. 3,615,127 issued to Edwin H. Land on Oct. 26, 1971; U.S. Pat. No. 3,597,062 issued to Rogers B. Downey on Aug. 3, 1971; and U.S. Pat. No. 3,537,784 issued to Rogers B. Downey on Nov. 3, 1970; all of which are assigned to the same assignee as the present application.

Processing or coating of the film strip with the liquid processing composition is accomplished by rapidly advancing the exposed film strip from the take-up reel through the processing station where an applicator applies a thin layer of liquid onto the emulsion. Generally, the film strip is held against the application by a pressure pad such that a significant amount of friction is applied to the film strip. A preferred method of advancing the film strip through the processing station is to rotatably drive the supply reel which pulls the film strip between the applicator and pressure pad and then winds up the treated portion of the film strip.

The quality of the developed print is, to a large extent, determined by the uniformity of the layer of processing composition applied to the emulsion. The uniformity of this layer is, in turn, influenced by the smoothness with which the film is transported across the liquid applicator.

The reel drive system should be configured such that it is capable of providing smooth film transport during the processing operation without introducing undesirable characteristics such as film vibration, twisting, or erratic velocity through the processing station. Other desirable characteristics include durability and low cost. Preferably, the component parts of the drive system should lend themselves to low cost molded plastic construction and yet the system should be durable enough to provide sufficient drive force to overcome the frictional forces at the processing station without causing excessive wear on the molded plastic parts.

Cassette or cartridge reels are generally rotatably mounted on axles or spindles within the cassette housing and usually include some means for receiving a drive shaft mounted in the camera or projector. One common source causing film vibration or erratic film transport velocity is a misalignment of the drive shaft axis of rotation with respect to the reel axis of rotation. Such misalignment or eccentricity causes the mating or coupling structure at the drive shaft and reel interface to move laterally relative to one another and transverse to the axes of rotation thereby shifting their points of contact in an erratic manner. This may tend to cause deformation or excessive wear at the interface and result in less than optimum performance of the drive system.

In the more conventional motion picture film handling systems employing laboratory film processing, the uniformity or smoothness of the reel drive system is relatively unimportant. During exposure and projection modes of operation, the film is transported past the exposure or projection station by a reciprocating claw mechanism and is usually isolated from the reel drive system by appropriate snubbers or film tension regulators. Since the film is laboratory processed, there is no particular need to be concerned about the smoothness or uniformity of film transport during rewind operations.

Also, conventional drive systems are not subjected to the relatively high stress levels induced by the friction at the processing station and the possibility of excessive wear at the reel and drive shaft interface.

The prior art disclosed numerous systems for coupling camera or projector drive shafts to cassette reels. Broadly, these systems fall into two categories: a rigid coupling which may include a drive shaft having splines therein which are adapted to be inserted into key-way slots formed at the periphery of an open bore reel hub; and a "floating" coupling system wherein the point or points of contact between the drive shaft and the reel hub is allowed to vary to compensate for the eccentricity of the misaligned axes of rotation.

One disadvantage of employing a rigid coupling system with the multi-purpose cassette is that the misalignment of reel and drive shaft may induce vibrations in the reel which would tend to propagate through the film to the fluid applicator.

The "floating" coupling systems found in the prior art generally include a drive shaft having coupled thereto an arm or arms extending outwardly in a direction normal to the axis of rotation of the shaft and a pin or projection depending from the end of the arm or arms which is substantially parallel to but is spaced from the axis of rotation. The reel generally comprises structure associated with the reel hub including one or more arms or blades extending outwardly from the axis of rotation in a radial plane. Each of the blades includes a surface or face, which is generally planar, against which the off-axis pin on the drive shaft bears to engage the reel in driving relation.

As the pin drives the reel, the eccentricity of the reel and drive shaft axes causes the pin to slide in a radial direction against the reel blade thereby resulting in a floating point or line of contact.

This particular type of reel coupling system is not well suited for use with a multi-purpose cassette which includes molded plastic reels. Because of the high stress levels imposed during the processing operation, the off-axis drive shaft pin will tend to wear a depression or groove in the planar face of the reel blade. This will tend to introduce vibration into the system as the radially moving off-axis drive shaft pin enters or leaves the depression which may have an undesirable effect on the uniformity of the coating of the film strip.

SUMMARY OF THE INVENTION

The present invention relates to a multi-purpose film cassette and photographic apparatus with which the cassette is adapted to be used. More specifically, a system for coupling a cassette reel to a camera or projector drive shaft is provided which is uniquely configured to compensate for eccentricity of the reel and shaft axes of rotation and minimize wear at the reel and drive shaft interface. By limiting wear to preselected areas of the reel and drive shaft couplings, the probability of introducing vibration into the system is minimized thereby enhancing the quality of the film processing operation.

Other features of the system include cooperating structure which automatically aligns the reel and drive shaft such that they may be coupled together even though the interface therebetween is out of the field of view of the user; and the incorporation of an actuating device into the system which serves to unlock the reel for rotation in response to locating the reel and drive shaft in operative association.

In a preferred embodiment, a multi-purpose cassette, of the type previously described, includes supply and take-up reels, each of which includes integrally formed coupling means for receiving a drive shaft. The coupling means include one or more (preferably two) blades extending outwardly from the reel axis of rotation in a radial plane towards the circumference of the reel. Each blade is provided with a substantially vertical face or surface which is positioned to be engaged and driven by an off-axis projection or drive pin mounted on the camera or projector drive shaft. The vertical drive surface is configured to form a relatively large radius arc such that the drive projection engages a curved and preferably a convex surface rather than a planar radial surface.

The off-axis driving projection on the drive shaft preferably includes a substantially vertical and planar driving surface for engaging the curved surface on the blade. Contact between the projection and blade is at a tangent point. During rotation, if there is misalignment between the axis of rotation of the reel and drive shaft, the two engaged surfaces will tend to slide, in a radial direction relative to one another, thereby providing the floating characteristic of the coupling such that vibration is minimized.

If one analyzes the dynamics of the interface, it will be found that the driving force tends to be applied to the convex face of the blade at a fixed distance from the reel axis while the planar face of the off-axis projection is contacted over a relatively large area. The frictional forces at the tangent point will tend to wear down or blunt the convex face but will not form a groove or depression in this surface. In other words, by preferentially deforming the convex face, i.e., by causing any deformations due to wear to preferentially occur in the convex face, it is possible to maintain a relatively smooth transition surface for the sliding projection on the drive shaft and thereby minimize the amount of vibration introduced into the transport system.

The drive shaft coupling, which is adapted to provide the reel driving force to a great number of multi-purpose cassettes, is configured such that the frictional forces applied to its off-axis projection are distributed over the planar surface rather than being concentrated at a point, thereby increasing its service life and allowing it to be formed of a plastic material despite the high stress imposed on the drive system by the friction forces on the film strip at the processing station.

Therefore, it is a feature and object of the present invention to provide a multi-purpose film cassette and photographic apparatus for use therewith which are provided with a reel and drive shaft coupling system for enhancing the smoothness of film transport especially during film processing operations.

It is another feature and object of the present invention to provide a multi-purpose film cassette and photographic apparatus for use therewith which includes a floating system for coupling a cassette reel to a camera or projector drive shaft to compensate for any misalignment of the reel and drive shaft axes of rotation which minimizes wear at the reel and drive shaft interface.

Another feature and object of the invention is to provide a reel and drive shaft coupling system in which wear is limited to preselected areas of the coupling to minimize vibration induced in a film transport system; to extend the service life of component parts of the coupling system; and to realize a cost saving by allowing such components to be formed of a plastic material.

It is yet another feature and object of the present invention to provide a reel and drive shaft coupling system of the aforementioned type which includes a reel having a radial extending blade which includes a curved face or surface which is adapted to be engaged by an off-axis projection on the drive shaft.

Another feature and object of the invention is to provide a reel and drive shaft coupling system which includes a reel blade and drive shaft projection having complementary oblique surfaces which cooperate to align the reel and drive shaft such that they may be engaged in driving relation.

It is yet another feature and object of the present invention to provide a reel and drive shaft coupling system minimizes wear on the face of an off-axis drive shaft projection.

Another feature and object of the invention is to provide a multi-purpose film handling cassette including supply and take-up reels which are uniquely configured to enhance film processing operations.

It is yet another feature and object of the invention to provide a multi-purpose cassette which includes supply and take-up reel locking devices and a camera and projector which includes actuating means for unlocking the reels in response to locating the reels in operative association with reel drive shafts mounted in the camera and projector.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 4c is a perspective view of the end of drive shaft assembly of FIG. 4a;

FIG. 6 is a perspective view of a motion picture camera with which the multi-purpose cassette is adapted to be used; and FIG. 7 is a perspective view, partly in section, of a motion picture projector showing a multi-purpose film handling cassette located at an operative position therein.

DESCRIPTION OF THE PREFERRED EMBODIMENT

Figure 1:
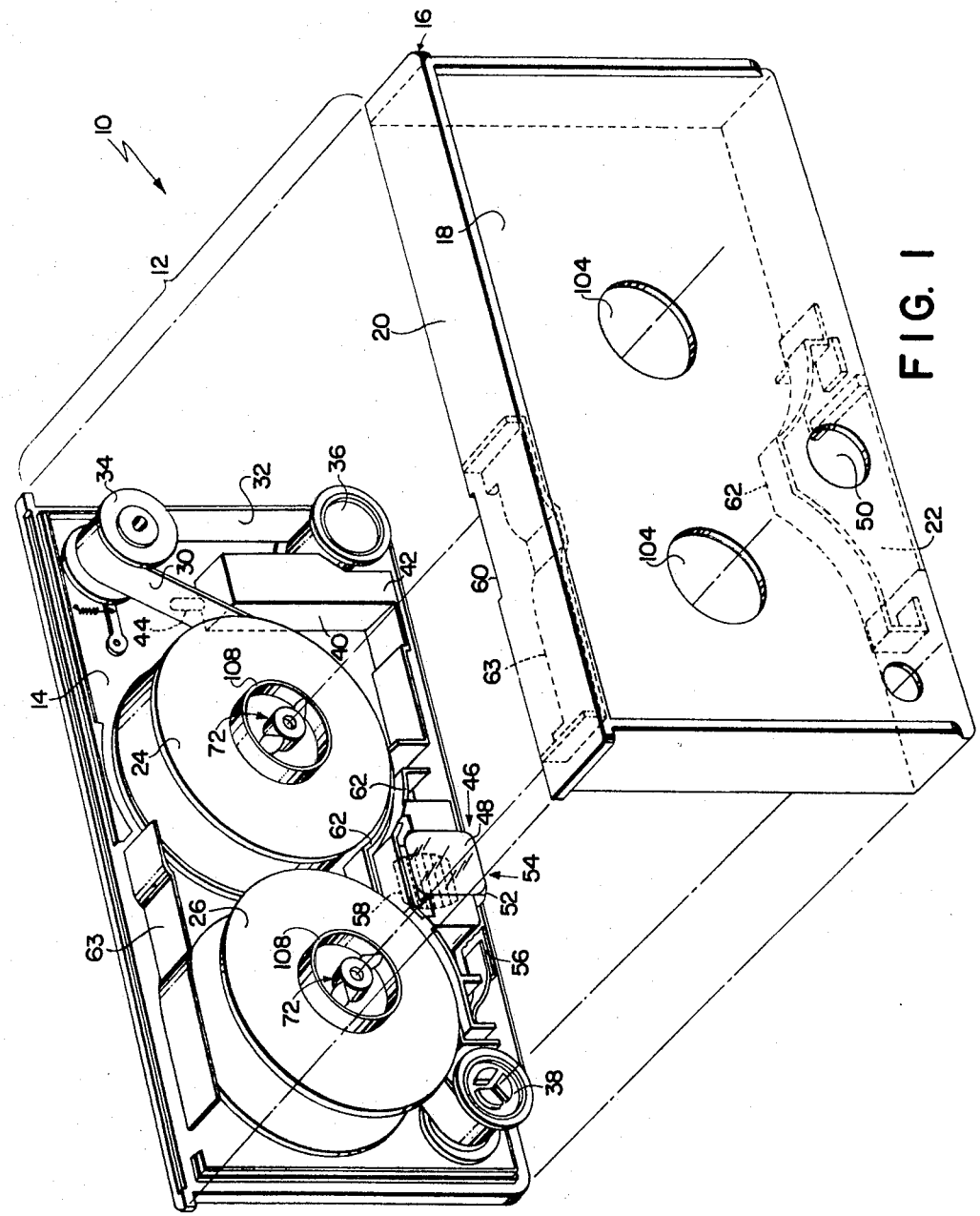
FIG. 1 is an exploded perspective view of a multipurpose film handling cassette embodying the instant invention showing the construction and location of various cassette components within the cassette housing.

In the preferred embodiment of this invention a processing fluid is applied to a film structure which comprises both a photosensitive image recording layer and an image receiving layer in which a visible image may be formed by image forming substances transferred by diffusion from the photosensitive layer without necessitating the subsequent removal of the processed photosensitive layer. This highly desirable type of film structure is made possible by a developed negative image having low covering power.

In typical silver halide diffusion transferreversal processes for the production of black and white images, a silver halide developer and a silver halide solvent are applied in an aqueous alkaline solution to a photo exposed silver halide stratum or emulsion where they develop exposed silver halide to silver and react with unreduced silver halide to form a soluble silver complex. This complex, in order to form a positive print, is transferred and reduced to silver on a silver receptive stratum on which the silver halide stratum has been superposed. It has generally been the practice, in the completion of this process, to separate the silver receptive and silver halide strata in order to render the positive image visible, particularly, when it is to be viewed in transmitted light.

However, as indicated above, the positive print may be rendered visible without separation of the silver halide and silver receptive strata. For example, the silver receptive stratum may be so constituted as to provide an unusually vigorous silver precipitating environment which causes the silver deposited upon it, in comparison with silver developed in the silver halide stratum, to possess very high covering power, i.e., opacity for a given mass of reduced silver. If the exposed silver halide when fully developed gives rise only to a predetermined low maximum density, and if the silver complex is reduced to silver in a vigorous silver precipitating environment, the resulting negative and positive images may remain in superposition to provide a composite that represents a good image for projection purposes if the images are carried on a light-transmitting support. Since the silver halide stratum and the silver receptive stratum need not be separated, a simplification of the overall silver halide diffusion transfer-reversal process is achieved.

A composite film assembly of this type as well as processing compositions for producing a stable black and white image which can be viewed by transmitting light without the necessity of removing the processed, negative image containing photosensitive layer are shown in prior U.S. Pat. No. 2,861,885 of Edwin H. Land and which issued on Nov. 25, 1958. Other composite film assemblies capable of producing photographic records which can be exhibited in full color without the necessity of removing the processed photosensitive layer as shown in prior U.S. Patents of Edwin H. Land, U.S. Pat. Nos. 2,726,154, issued Dec. 6, 1955 and 2,944,894, issued July 12, 1960. All of these prior patents are assigned to the same assignee of the present invention.

However, it should be noted that the present invention is not directed to the chemistry by which visible images are formed in an exposed photosensitive material and/or formed in an image receiving stratum associated therewith. While an illustrative preferred embodiment of the invention is shown applying a processing fluid to a film structure not requiring the removal of the photosensitive layer after visible image formation is completed, the invention itself is also applicable for use with other types of processing fluids and film structures.

Referring now to FIG. 1 of the drawings, a multipurpose film handling cassette is shown generally at 10. Cassette 10 includes a substantially rectangular parallelepiped shaped houseing 12 formed by a rectangular base section or side wall 14 supporting various cassette components and a mating cover 16 for enclosing those components.

Cover 16 includes a rectangular side wall 18 and an integrally formed depending peripheral wall 20 which serves to space side walls 14 and 18 in parallel relation to one another. A generally rectangular opening 22 in peripheral wall 20 serves as a film gate for providing access for light rays to be directed toward incremental sections of a film strip which is adapted to be progressively transported past opening 22 during exposure and projection modes of operation.

Figure 2:
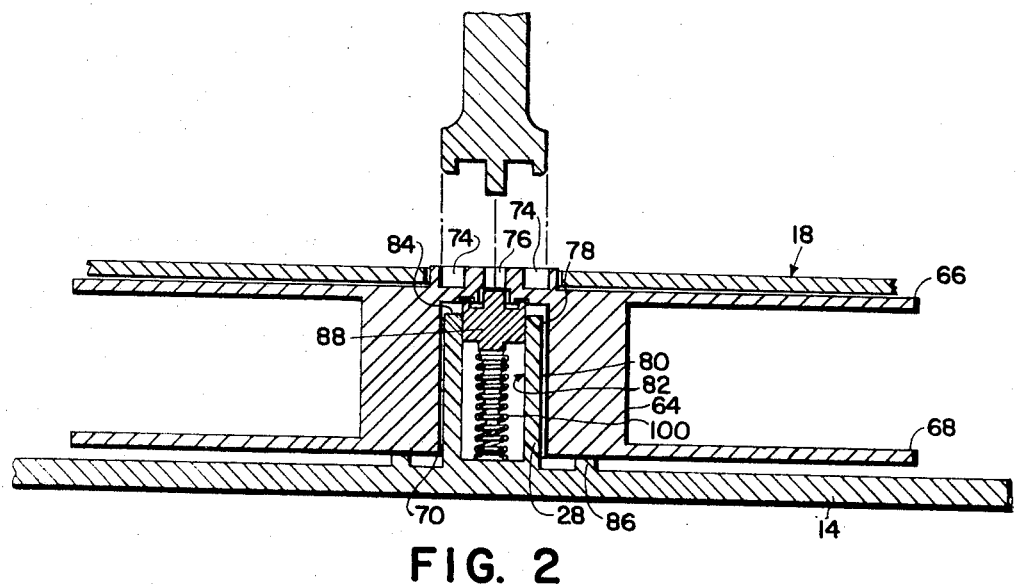
FIG. 2 is an enlarged cross-sectional view of a section of a cassette and a reel drive shaft showing a reel including a reel locking device and a drive shaft coupling member, and a drive shaft mounted actuating pin and reel coupling member.
Figure 3:
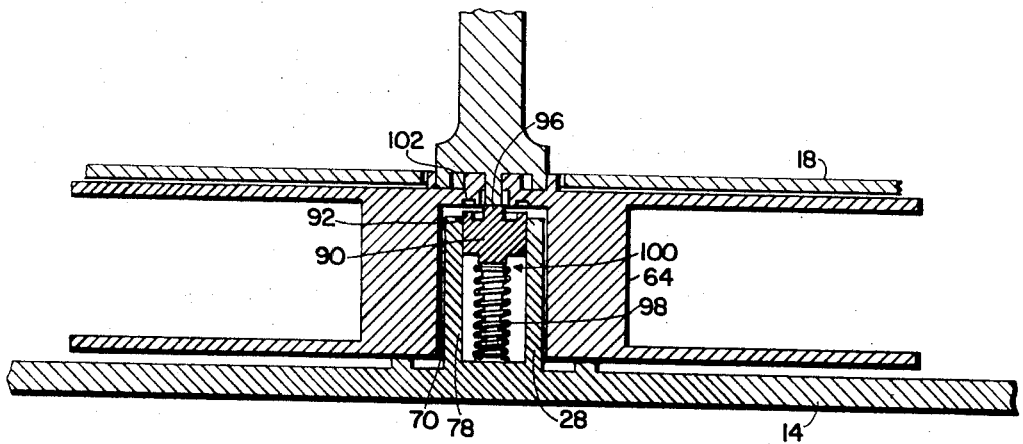
FIG. 3 shows the drive shaft and reel of FIG. 2 in operative engagement.

A supply reel 24 and take-up reel 26 are rotatably mounted on a pair of reel bearings 28 (only one of which is shown in FIGS. 2 and 3) which are preferably integrally formed with side wall 18 and are disposed such that reels 24 and 26 may be located in side-by-side coplanar relation with their respective axes of rotation substantially normal to side walls 14 and 18. A detailed description of reels 24 and 26, reel bearings 28, and drive shaft coupling structure and reel locking devices associated therewith will appear later.

Fixedly attached at its ends to supply reel 24 and take-up reel 26 is a length of unexposed film strip 30 of the type previously described. Film strip 30 includes a photosensitive emulsion 32 on one side thereof and conventional sprocket holes (not shown) along one edge thereof which are adapted to be engaged by camera and projector claw mechanisms, positioned to extend through opening 22 for progressively transporting incremental sections of film strip 30 past opening 22 during exposure and projection modes of operation.

In traveling from supply reel 24 to take-up reel 26, film strip 30 sequentially passes around idlers or rollers 34, 36, and 38 disposed near three successive corners of side wall 14. As best shown in FIG. 1, rollers 34 and 36 occupy, respectively, the first two corners intermediate supply reel 24 and opening 22 and roller 38 occupies the next successive corner intermediate opening 22 and take-up reel 26.

Initially, the major portion of film strip 30 is stored on supply reel 24 with its photosensitive emulsion side 32 facing outwardly from the supply reel hub thereby passing around rollers 34, 36, and 38 with the emulsion side 32 facing inwardly toward the rollers such that film strip 30 is presented at opening 22 with its emulsion side 32 facing the interior of cassette housing 12. It will be noted that film strip 30 includes a transparent base through which image bearing light may be transmitted to cause exposure of the photosensitive emulsion.

In operation, the cassette is mounted in an appropriate camera (to be described hereinafter) such that opening 22 is aligned with the camera lens and shutter mechanism and film strip 30 is exposed as it is progressively transported past opening 22 onto take-up reel 26. Cassette 10 may then be immediately transferred to a suitable projector (to be described hereinafter for processing or developing the exposed film strip 30 during its initial rewind from take-up reel 26 to supply reel 24.

As noted earlier, processing is accomplished by coating the emulsion side 32 of the exposed film strip 30 with a liquid processing composition to provide a positive print by a diffusion transfer process. For this purpose, cassette 10 is provided with a normally inoperative processing station formed by a processing fluid dispenser 40 supported by side wall 14 with its lower applicator end 42 located adjacent the path of travel of emulsion side 32 intermediate opening 22 and roller 36. Dispenser 40 includes a container having therein a supply of viscous developing fluid. The lower applicator end 42 includes an orifice which acts as a nozzle for feeding a doctor blade to supply a carefully measured thickness of the film processing fluid to the emulsion side 32 of film strip 30. A rupturable membrane is provided across the orifice to render the dispenser inoperative. Dispenser 40 also includes a plunger 44 which is actuable by means in the view to apply pressure to the container during the processing mode of operation. The pressure causes the membrane to rupture thereby permitting the fluid to flow through the orifice and across the doctor blade for application to the film strip as it is transported past the doctor blade during its initial rewind into supply reel 24.

As noted earlier, film strip 30 is preferably held against the applicator end 42 of dispenser 40 by means of a pressure pad (not shown) such that there is a certain amount of drag on the film strip as it is transported between the doctor blade and the pressure pad. A more detailed description of dispenser 40 may be found in U.S. Pat. No. 3,615,127.

Development is completed in a relatively short time and, almost immediately, the processed film strip 30 may be transported past opening 22 for projection.

To facilitate projection of film strip 30 at opening 22, cassette 10 is provided with a light-reflecting element which in the preferred embodiment may take the form of a molded plastic prismatic lens 46. As best shown in FIG. 1, lens 46 is mounted on side wall 14 and includes a substantially flat, transparent, light-receiving surface 48 which is aligned with an opening 50 in side wall 18 for receiving light from a projection lamp associated with the projector. The light entering prismatic lens 46 through surface 48 is reflected from an internal reflecting surface (not shown) for changing its direction by approximately 90° and out through a convex transparent surface 52 aligned with opening 22 for projecting the film strip as it is transported past surface 52. Thus prismatic lens 46 and opening 22 cooperate to define a combination exposure and processing station 54 therebetween.

A prismatic lens of this type, suitable for use in connection with the present invention, is described in co-pending application, Ser. No. 214,591 now U.S. Pat. No. 3,807,842 filed on Jan. 3, 1972 by Philip G. Baker and is assigned to the same assignee as the present invention.

For locating film strip 30 at its proper position for exposure and projection, cassette 10 is provided with a spring biased film pressure plate 56 which is adapted to cooperate with camera and projector aperture plates for accurately positioning film strip 30 with respect to the combination exposure and projection station 54.

To enhance drying of the precessed film strip, the cassette is provided with an air inlet 58 formed in side wall 14 behind lens 46 and an air outlet 60 formed in peripheral wall 20. During the drying and/or projection modes of operation, air supplied by an air blower mounted in the projector enters cassette housing 12 through air inlet 58 and flows over a portion of lens 46 thereby cooling the lens which tends to be heated by the projection lamp and heating the incoming air. The air is then directed toward the interior of the housing by baffles 62 which cooperate to form a light sealing and air distributing labyrinth. After flowing across reels 24 and 26 to facilitate film drying, the air is directed by light sealing and air distributing baffles 63 out of housing 12 through air oulet 60.

Figure 4A:
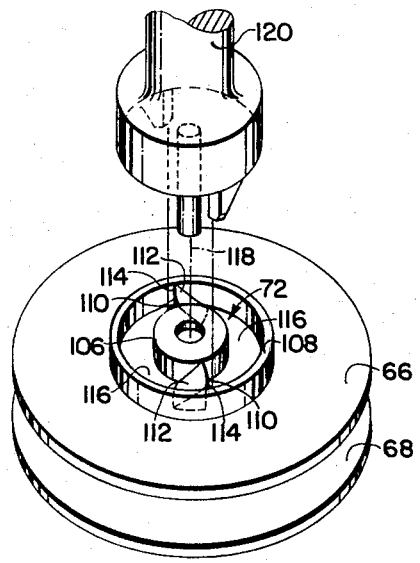
FIG. 4a is a perspective view of a reel and drive shaft assembly embodying the instant invention.
Figure 4B:
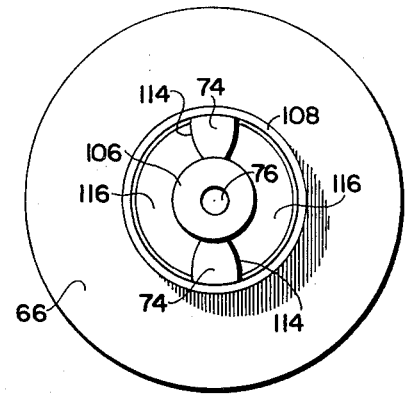
FIG. 4b is an elevational view of a reel embodying the instant invention.
Figure 4C:
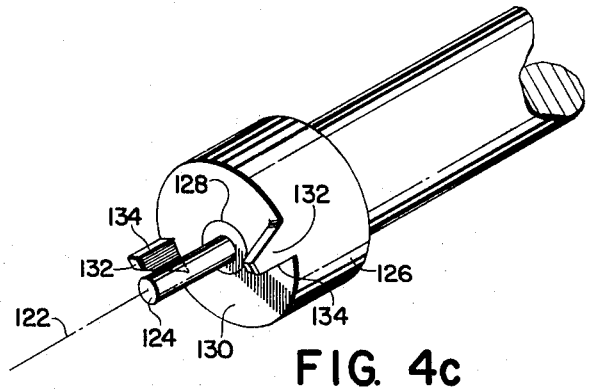

Turning now to the construction and operation of reels 24 and 26, reel bearings 28, and their associated drive shaft couplings and reel locking devices, attention is directed to FIGS. 2, 3 and 4. It will be understood that the term reel also is intended to include other devices for holding an elongated web of material such as a spool, etc.

For the purpose of illustration, only the supply reel 24 is shown in detail since, for the most part, the supply and take-up reel assemblies are very similar.

Supply reel 24 includes a central hub section 64 (See FIGS. 2 and 3) and top and bottom spaced guide flanges 66 and 68 integrally formed and coaxially disposed with hub section 64 to extend outwardly in a radical direction therefrom. Hub section 64 is provided with a central smooth bore reel bearing sleeve 70 extending from the interior surface of top flange 66 through the bottom flange 68. Integrally formed with top guide flange 66 and extending upwardly therefrom is a drive shaft coupling member 72 (to be described in detail hereinafter) which includes a pair of radially extending blades 74 and a central opening 76 extending through flange 66 such that it communicates with reel bearing sleeve 70.

As best shown in FIGS. 2 and 3, the means for rotatably mounting supply reel 24 within cassette housing 12 includes reel bearing 28. In the preferred embodiment, bearing 28 may take the form of a fixed axle or mounting post 78 which is preferably integrally formed with cassette side wall 14. The mounting post 78 includes a smooth outer surface 80 and is dimensioned to receive reel bearing sleeve 70 such that bottom reel flange 68 rests atop an annular locating member 86 integrally formed with side wall 14 around post 78. Post 78 also includes a star shaped fluted bore 82 extending from its top end 84 down to a point slightly above the interior surface of side wall 14.

In order to prevent rotation of reel 24 with respect to bearing 28 when the cassette is not operatively associated with the camera or projector, bearing 28 has a reel locking device 88 operatively associated therewith. As best shown in FIGS. 2 and 3, locking device 88 is coaxially disposed with reel 24 and reel bearing 28 and inlcudes a section 90 which is substantially square in cross section.

Section 90 includes four inverted V-shaped detents 92 integrally formed with an extending above its top surface 94. Detents 92 are symmetrically disposed about a centrally located protrusion 96 and terminate at the four corners of section 90. Integrally formed with the bottom of section 90 and extending downwardly therefrom is a tapered post 98 for receiving a locking device biasing spring 100.

Locking device 88 and spring 100 are most advantageously disposed within the star-shaped bore 82 of mounting post 78. Section 90 is dimensioned such that its four corners extend into the points of the star flutes thereby preventing rotation of device 88 with respect to post 78 but permitting axial displacement relative thereto.

Supply reel 24 includes four recesses 102 symmetrically disposed about opening 76 in the interior surface of top flange 66. The function of recesses 102 is to receive the four detents 92 associated with locking device 88 for coupling reel 24 to device 88 which is in turn keyed to mounting post 78 thereby locking reel 24 to prevent its rotation.

Spring 100 urges locking device 88 toward its locking position wherein detents 92 extend into recesses 102 and protrusion 96 extends into reel opening 76. It will be noted that reel 24 may not rotate more than one quarter of a revolution before detents 92 enter recesses 102.

In order to unlock reel 24, reel locking device 88 is axially displaced downwardly, against the bias of spring 100, such that it assumes the unlocking position shown in FIG. 3 wherein device 88 is retracted into post 78.

Turning now to the construction of the reel drive shaft couplings 72 which are accessible through circular openings 104 in cassette side wall 18, the pair of radially extending blades 74 are preferably formed of the same thermoplastic material (e.g. polystyrene) as the reels 24 and 26 such that they may be integrally molded with the top surface of reel flange 66. Blades 74 extend between an integrally formed circular hub 106 containing opening 76 and an integrally formed upstanding annular projection 108 which is adapted to extend through openings 104 in side wall 18 for light sealing purposes.

Each blade 74 includes: a driving face or a first surface 110 which is disposed in a plane that is substantially normal to the top surface of reel flange 66 and is curved in the radial direction such that it defines a relatively large radius convex arc; and a second planar oil blade surface 112 which is obliquely disposed with respect to the convex drive face 110 and the top surface of guide flange 66 such that it intersects drive face 110 along a line 114. Hub 106, annular projection 108, and blades 74 cooperate to define a pair of arcuate slots or recesses 116 therebetween each of which is bounded at one end by a vertical convex drive face 110 and at the opposite end by an inclined or ramped surface 112.

It will be noted that hub 106, projection 108 and blades 74 are symmetrically disposed with respect to a vertical axis of rotation 118 of reel 24 which passes through the center of opening 76 and bearing sleeve 70. However, since the supply reel 24 and the take-up reel 26 are adapted to be driven in opposite directions, the blades 74 on the supply reel 24 have the opposite configuration from the blades 74 on the take-up reel 26 as best shown in FIG. 1.

The supply and take-up reels are adapted to be rotatably driven by drive shaft assemblies mounted in the camera and projector. A preferred drive shaft assembly is shown in FIGS. 2, 3, and 4 and includes a shaft 120 which is adapted to rotate about its longitudinal axis 122, an actuating pin 124 coaxially disposed with and depending from the end of shaft 120, and a reel coupling member 126 fixedly secured near the end of shaft 120.

Reel coupling member 126 is preferably formed of a high strength composite plastic material, e. g., a glass filled composite material, which is harder and more durable than a normal plastic material. A central longitudinal bore 128 is provided in member 126 for receiving the end of shaft 120 and member 126 is fixedly secured to the end of shaft 120 for rotation therewith.

Depending from a substantially planar end face 130 of member 126 are a pair of off-axis projections 132. Projections 132 are spaced from and are substantially parallel to the drive shaft axis of rotation 122 about which they are symmetrically disposed. Each projection 132 includes a planar drive face 134 which is disposed in a radial plane that is substantially normal to end face 130 and a planar alignment face 136 which is oblique with respect to drive face 134 and end face 130.

Figure 5A:
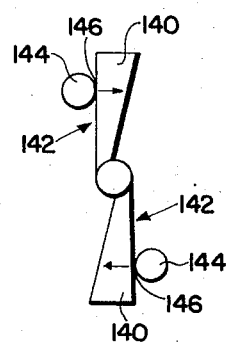
FIG. 5a is a diagrammatic illustration of a prior art reel and drive shaft coupling system to show the forces at the coupling interface.
Figure 5B:
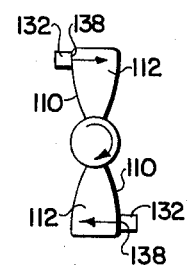
FIG. 5b is a diagrammatic illustration of the forces at the interface of a coupling embodying the instant invention.

As the drive shaft assembly is engaged with the reel 24 (See FIGS. 2 and 3) actuating pin 124 extends through reel opening 76 and depresses the reel locking device 88 to unlock the reel 24 for rotation. The off-axis projections 132 extend into the arcuate slots 116 such that the planar projection surfaces 134 are positioned in face-to-face relation with the convex blade surfaces 110. As best shown in FIGS. 5b, in response to clockwise rotation of drive shaft 120, projection surfaces 134 engage the convex blade surfaces 110 at tangent points 138 and drive the reel 24 in a clockwise direction.

It will be noted that the oblique alignment surfaces 112 and 136 function as camming surfaces to properly align the reel and drive shaft assembly such that the drive shaft projections 132 may enter arcuate slots 116. If projections 132 are not directly aligned with blades 74 when the reel is mounted on the drive shaft, the projections 132 may enter slots 116. On the other hand, if the projections 132 and blades 74 are in direct alignment, the two complementary oblique surfaces 112 and 136 will engage and cause a torque to be applied such that there is rotation of the drive shaft 120 and reel 24 relative to one another thereby permitting the projections 132 to enter slots 116.

As noted above, engagement of the planar projection surface 134 and the convex radially extending blade surface 110 is limited to a line of contact at the tangent point 138. During the course of one revolution of the drive shaft and reel, any eccentricity or misalignment of their respective axes of rotation 122 and 118 will cause relative movement of projections 132 and reel blades 74 in a direction transverse to their respective axes of rotation. Thus, surfaces 134 and 110 are configured to slide against one another to establish a "floating coupling" thereby minimizing the amount of vibration induced into the reel drive system.

If one analyzes the dynamics at the interface between the planar face 134 and the convex face 110 at tangent point 138, it will be found that the tangent point 138 on surface 110 tends to be stabilized at a fixed distance from the reel axis of rotation 118. On the other hand, the tangent point 138 on the planar surface 134 tends to float in a radial direction during the course of one revolution of the drive shaft and reel. In other words, the force on the convex surface 110 tends to be concentrated over a very small area of that surface while the force on the planar surface 134 is distributed over a relatively large area. Advantageously, this feature tends to extend the service life of the off-axis projections 132 which are permanently mounted in the camera and projector and are intended to drive the reels of a great number of multi-purpose cassettes.

During film processing operations, when the supply reel 24 is given in a clockwise direction (as viewed in FIG. 1) and pulls film strip 30 through the processing station, tension in the film strip builds up to a maximum and the forces at the drive shaft and reel interface are at a maximum. Since blades 74 are preferably of molded plastic construction, one can expect some wearing or deformation of the convex surface 110. As the planar projection face 134 slides against convex surface 110, frictional forces at the tangent point 138 will tend to blunt or flatten the curvature of surface 110. This, however, is preferable to the wear characteristics of the prior art coupling systems illustrated in FIG. 5a.

The prior art system includes a pair of radially extending reel drive blades 140 each of which includes a substantially planar drive surface 142 which is adapted to be engaged and driven by an off-axis drive pin 144. Applying the same analysis to the interface at tangent point 146 it will be found that the pin 144 "floats" in a radial direction on the planar blade surface 142 and will tend to wear a depression in the face of the blade. As the depression gets deeper, abrupt corners will be formed at the intersection of the depression and the planar surface 142. As the radial moving pin 144 makes the transition over these corners, a significant amount of vibration may be introduced into the reel drive system and adversely effect the film processing operation.

On the other hand, when the convex surface 110 is blunted or flattened, the transition surface between the convex surface 110 and the deformed area is relatively smooth and free of abrupt corners or edges such that induced vibration will be minimized. Thus by selectively controlling the type and location of wear at the drive shaft and reel interface vibration may be minimized and the service life of the components of the reel drive system may be extended.

In passing, one may consider providing a planar drive face or blade 74 and driving it with a planar drive face on projection 132. If there is any eccentricity of the drive shaft and reel axes of rotation, the dynamics at the coupling interface becomes less predictable and advantages of "line contact" are lost. In all likelihood, vibration or "chatter" will be maximized with such a system. Moreover, it is likely that the radially moving projection will tend to dig in or bind with relatively sharp corners which would be necessary at the intersection of a planar blade drive face with hub 106 and annular projection 108.

A motion picture camera with which cassette 10 is adapted to be used to expose film strip 30 is shown generally at 210 in FIG. 6. Camera 210 includes a housing 212, means defining a chamber 214 in housing 212, which is accessible by opening door 216, for receiving and supporting cassette 10 at an operative position therein; exposure means including a lens 218 and a shutter mechanism (not shown); film transport means including a claw mechanism (not shown); take-up reel drive means 220 including a drive shaft 120 having a reel locking device actuating pin 124 and a reel coupling member 126 associated therewith, and supply reel locking device actuating pin 224 which may be carried by a fixed locating shaft 226.

It will be noted that in the preferred embodiment take-up reel 26 is driven to collect the advancing film strip 30 while supply reel 24 is free to rotate in response to the film strip being drawn therefrom. Therefore, shaft 226 is not a drive shaft but serves to position actuating pin 224 in alignment with opening 76 in supply reel 24.

In operation, cassette 10 is inserted into chamber 214 with opening 22 in peripheral wall 20 facing forwardly towards lens 218. Take-up reel actuating pin 124 and supply reel actuating pin 224 extend through the reel openings 76 and axially displace the reel locking devices 88 from the locking position of FIG. 2 to the unlocking position of FIG. 3 and the off-axis projections 132 on the take-up reel coupling member 126 extend into the arcuate take-up reel slots 116. Cassette 10 is thereby located at its operative position within camera 110 and is in operative association therewith and door 116 may be closed.

Film exposure is accomplished by actuating a battery powered motor (not shown) within the camera which is adapted to drive the claw mechanism, shutter, and take-up reel drive shaft 120. The claw mechanism engages the sprocket holes in film strip 30 and progressively transports incremental sections thereof past opening 22 for exposure to image bearing light provided by lens 218. After the film strip 30 proceeds past opening 22, it passes around roller 38 and is wound onto the counterclockwise rotating take-up reel 26 which is driven by the planar drive faces 134 of projections 132 bearing against the convex faces 110 of reel blades 74.

Roller 38 may be configured to have its rotation selectively arrested by a mechanism in camera 110 thereby providing "snubbing action." Also roller 34 may be resiliently mounted for reciprocating movement between an initial position and an energized position for continuously forming a feed loop of film strip between supply reel 24 and opening 22 to isolate that portion of the film strip 30 near opening 22 from the inertial drag of supply reel 24.

It will be noted that when cassette 10 is located at its operative position within camera 210 the axis of rotation 118 of take-up reel 26 is adapted to be in substantial alignment with the axis 122 of drive shaft 120. An misalignment of these axes 118 and 122 will be compensated for by the floating action of the planar drive faces 134 which are adapted to slide on the convex reel drive face 110. In the case of extreme eccentricity, it is possible that only one projection 132 will be in driving engagement with one blade 74 at any one time and that the blades and projections in contact will change during the course of one revolution of drive shaft 120 and reel 26.

Upon withdrawing cassette 10 from camera 210, actuating pins 124 and 224 are disengaged from reel locking devices and springs 100 automatically move them back to the locking position.

After exposing film strip 30, cassette 10 may be transferred to a projector or viewer, preferably of the type shown in FIG. 7 at 240, for film processing and projection.

Viewer 240 includes a box-like housng 242 formed in part by a rear projection screen 244. It will be understood that while viewer 240 includes a self-contained projection screen, cassette 10 is also suitable for use with a projector which is adapted to project images onto a remote viewing screen.

Located in a top wall 246 of housing 242 is an elongated rectangular access slot 248 communicating with a substantially parallelpiped shaped open-ended chamber 250 for receiving and supporting cassette 10 at an operative position within viewer 240. Cassette 10 is adapted to be inserted through access slot 248 with opening 22 facing a bottom wall 252 of chamber 250.

Suitable projection means including a lens 254, a rotary shutter, and claw mechanism (neither of which is shown) are mounted below chamber 250 so as to be aligned with opening 22 when cassette 10 is fully inserted in chamber 250.

A projection lamp housing 256 is positioned adjacent chamber 250 such that a projection lamp therein is aligned with the light-receiving face 48 of prismatic lens 46. Light rays from the lamp pass through lens 46, an incremental section of film strip 30, opening 22 and then through lens 254 to a mirror 257 which is angularly disposed to reflect the light rays to the rear of projection screen 244.

Viewer 240 is also provided with supply reel drive means 258 and take-up reel drive means 260. Each of these drive means includes a drive shaft 120 coupled to a motor through appropriate gearing and slip clutches (not shown) for rotation about their respective spaced, parallel axes of rotation 122. Each of the drive shafts 120 includes a coaxially disposed actuating pin 124 extending outwardly from the end thereof and an appropriately configured reel coupling member 126 fixedly secured thereto. It will be noted that projections 132 on the take-up reel coupling member 126 are oriented to position drive surfaces 134 in face-to-face relation with take-up reel convex surfaces 110 when the take-up reel drive shaft is driven in a counterclockwise direction and the orientation of projections 132 on the supply reel coupling is reversed such that the supply reel 24 may be driven in a clockwise direction.

As noted earlier, it is most desirable to insure that film transport is as smooth as possible during the coating operation to maintain the quality of the positive print. Also, it is during this initial rewind processing operation that the stress levels induced in the drive shaft to reel coupling are at a maximum because of the drag applied to the film strip at the processing station. The characteristics of the reel coupling system, as previously described in detail, help to provide such smooth film transport and through selective wear at the drive shaft and reel interface minimize vibration induced into the film transport system due to misalignment or eccentricity of the drive shaft axes of rotation 122 with respect to the reel axes of rotation 118.

During this processing cycle, an air blower (not shown) may blow air into cassette housing 12 through air inlet 58 to enhance film drying. It will be noted that air outlet 60 is advantageously aligned with viewer access slot 248 such that the air may be discharged therethrough from the cassette to the exterior of viewer 240.

In operation, cassette 10 is located at its operative position within the receiving chamber 250 of viewer 240. The supply and take-up reel drive shafts 120 are then axially displaced toward the reels 24 and 26 by means within the viewer (not shown) such that actuating pins 124 extend through reel openings 76 and axially displace reel locking devices 88 from their locking positions to their unlocking positions and reel coupling members 126 are in driving engagement with drive shaft couplings 72. Thus the drive shaft axes of rotation 122 are in substantial alignment with the take-up and supply reel axes 118.

The normally inoperative processing fluid dispenser 40 and the pressure pad for holding film strip 30 against the applicator end 42 are rendered operative by means (not shown) within the viewer 240.

The supply reel drive means 258 is energized to rotate its shaft 120 and reel coupling 126 in a clockwise direction thereby driving supply reel 24 in a clockwise direction. Reel 24 pulls the film strip 30 from take-up reel 26 and across the applicator end 42 of dispenser 40 where a thin layer of liquid processing composition is applied to the emulsion side 32 of the film strip to initiate the diffusion transfer process. The treated film strip 30 then passes around rollers 36 and 34 and is wound onto supply reel 24.

Shortly after the processing cycle, the pressure pad is disengaged and film strip 30 may be transported between prismatic lens 46 and cassette opening 22 for projection. To initiate the projection cycle, the project lamp is turned on to illuminate prismatic lens 46, the claw mechanism is activated for progressively transporting incremental sections of film strip 30 past opening 22 and prismatic lens 46, and take-up reel drive means 260 is rendered operative for rotating take-up reel 26 in a counterclockwise direction (as viewed in FIG. 1) to collect the advancing film strip. Like camera 210, viewer 240 may also include a mechanism for selectively arresting the rotation of roller 38 to provide snubbing action.

Advantageously, air may also be blown through cassette 10 during the projection cycle to cool prismatic lens 46. As the air flows over a portion of lens 46, it is heated thereby and serves to remove any remaining moisture in the developed film strip 30.

At the end of the projection cycle, film strip 30 is preferably rewound onto supply reel 24. In response to withdrawing shafts 120 from reel couplings 72, actuating pins 124 are disengaged from reel locking devices 88 which automatically return to their respective locking positions under the influence of springs 100.

For an example of a projector or viewer suitable for use in connection with the present invention, reference may be had to copending application Ser. No. 174,375 now abandoned, filed on Aug. 24, 1971 by Edwin H. Land and assigned to the same assignee as the present application.

It can readily be seen that many other variations and modifications of the present invention are possible in the light of the aforementioned teachings, and it will be apparent to those skilled in the art that various changes in form and in arrangement of components may be made to suit requirements without departing from the spirit and scope of the invention. It is therefore to be understood that within the scope of the appended claims the instant invention may be practised in a manner otherwise than is specifically described herein.

What is claimed is:

1. A film handling cassette for use with a motion picture camera of the type including at least one drive shaft adapted to rotate about a first axis of rotation and having coupled thereto a reel coupling member including at least one off-axis drive projection having a planar drive face, the drive projection being spaced from and disposed substantially parallel to the first axis with the planar drive face being disposed in a substantially radial plane, said cassette also being adapted for use with a motion picture projector or viewer of the type including at least two such drive shafts including such reel coupling members, such two drive shafts being adapted to rotate about a pair of spaced parallel first axes, said cassette comprising:

a substantially parallelepiped housing including a pair of side walls spaced in parallel relation by a peripheral wall;

a supply reel and a take-up reel mounted in coplanar relation within said housing for rotation about a pair of spaced parallel second axes of rotation which are substantially normal to said pair of side walls, said supply and take-up reels each including a hub section, spaced top and bottom guide flanges coaxially disposed with said hub section and extending in a radial direction therefrom, and drive shaft coupling means integrally formed with said top flange for coupling said reel to a reel coupling member on one of the drive shafts;

a length of photographic film strip having one end attached to said supply reel and the opposite end thereof attached to said take-up reel;

means for providing access at said peripheral wall for light rays to be directed towards an incremental section of said film strip as said film strip is progressively transported past said access means from said supply reel towards said take-up reel to facilitate film exposure and projection operations; and a processing station for coating said film strip with a liquid processing composition as said film strip is progressively transported past said processing station from said take-up reel towards said supply reel;

said reel coupling means on said supply and take-up reels each including a pair of radially extending blades, each of which includes a curved drive face which extends above said top flange in a plane which is substantially normal thereto and defines a relatively large radius convex arc extending in a substantially radial direction from said second axis, said curved drive face being adapted to be engaged and rotatably driven by the planar drive face of one of the drive projections when the cassette is operatively mounted in said camera or projector such that a drive shaft first axis is sub substantially aligned with a reel second axis of rotation, the planar projection drive face being adapted to slide against said curved reel drive face at a tangent point therebetween to compensate for eccentricity between the first axis of rotation with respect to said second axis of rotation, said tangent point on said curved drive face being at a substantially fixed distance from said second axis of rotation to minimize vibration induced in said supply or take-up reel as it is rotatably driven by one of the drive shafts.

2. A film handling cassette as defined in claim 1 wherein said pair of radially extending blades on said supply and take-up reels each further include a substantially planar alignment face which is disposed in an oblique plane with respect to said top flange and said curved reel drive face, said planar alignment face being adapted to engage a complementary oblique planar surface on the off-axis drive projection to provide a torque for rotating said reel and the drive shaft relative to one another such that the planar drive face on the drive projection is located in position to engage said curved reel drive face.

3. A film handling cassette as defined in claim 2 wherein said supply and take-up reel each further include a circular hub integrally formed with and extending above said top flange at one end of said pair of blades and an annular projection integrally formed with and extending above said top flange at the opposite end of said pair of blades, said hub and said annular projection being coaxially disposed with respect to said second axis and being configured to cooperate with said pair of blades to define a pair of arcuate slots therebetween for receiving the off-axid drive projection.

4. A film handling cassette as defined in claim 3 wherein said supply and take-up reels are each rotatably mounted on fixed mounting posts within said housing and said cassette further includes supply and take-up reel locking devices located within said mounting posts, said locking devices being mounted for movement along said second axes between a normal locking position in which they arrest rotation of said supply and take-up rells and an unlocking position in which they permit rotation of said reels, said circular hub sections on said supply and take-up reels each further including an opening therein communicating with said locking device through which an actuating pin mounted on a drive shaft may extend for engaging and moving said locking device from said locking position to said unlocking position in response to operatively engaging the drive shaft reel coupling member with said reel.

5. A film handling cassette as defined in claim 2 wherein said pair of blades on said supply reel have the reverse configuration of said pair of blades on said take-up reel and the drive projections on the reel coupling members are appropriately configured such that said supply and take-up reels may be rotatably driven in opposite directions.

6. A reel for holding an elongated web of material and being adapted to be rotatably driven by an externally mounted drive means that is rotatable about an axis and includes an off axis drive surface for engaging and rotatably driving said reel, said reel comprising:

a central hub section about which the elongated material is adapted to be wound, said hub section having an axis of rotation about which reel is adapted to be rotated by the externally mounted drive means;

at least one reel flange coupled to and coaxially disposed with said hub section for supporting an elongated web of material wound about said hub section, said flange extending outwardly from said hub section in a radial plane of said reel that is substantially normal to said reel axis of rotation and terminating in a circular peripheral edge that defines a circumference of said reel; and coupling means adapted to be engaged by the off axis drive surface of the externally mounted drive means for coupling said reel in driving relation to the externally mounted drive means, said coupling means including a convex surface that is substantially normal to said radial plane of said reel and extends outwardly from said hub section toward said circumference of said reel.

7. A reel as defined in claim 6 further including a substantially planar alignment surface which is disposed in an oblique plane with respect to said flange and said convex surface, said planar alignment surface being adapted to engage a complementary oblique planar surface on the externally mounted drive means to provide a force for rotating said reel and drive means relative to one another such that the off-axis drive surface is located in position to engage said convex surface on said reel.

* * * * *